Feb. 3, 1942. P. HERMANSPANN ET AL 2,271,550
OPTICAL AND ACOUSTIC INDICATOR FOR DIRECTIONAL RECEIVERS
Filed Jan. 12, 1939   3 Sheets-Sheet 1
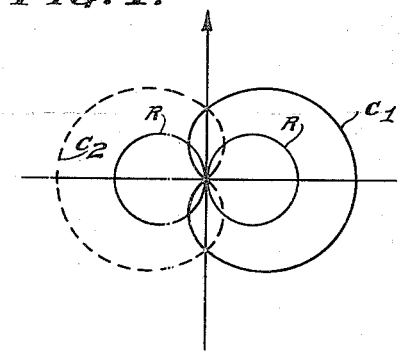
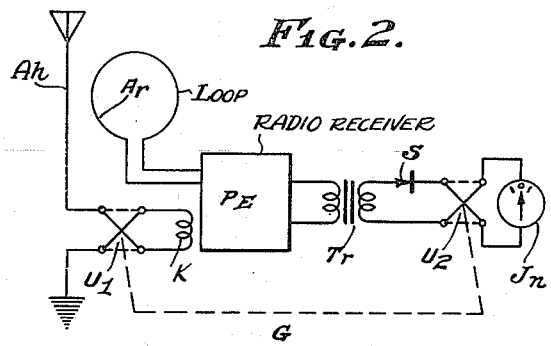
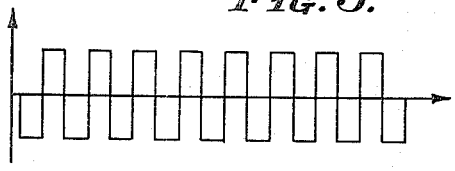
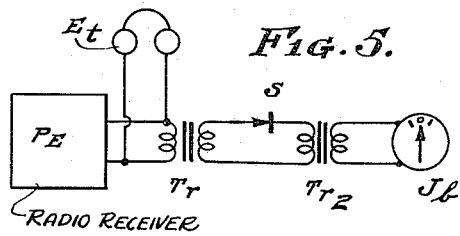
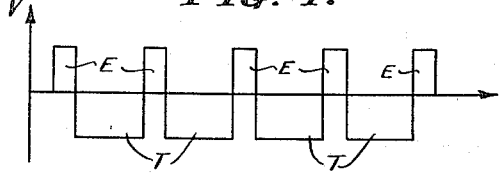
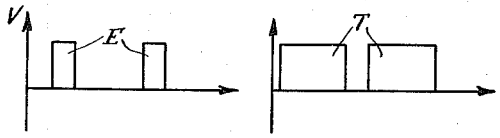
Inventors
Paul Hermanspann
& Rudolf Weber
By
Attorney Inventors
Paul Hermanspann
& Rudolf Weber
By
Attorney Feb. 3, 1942.   P. HERMANSPANN ET AL   2,271,550
OPTICAL AND ACOUSTIC INDICATOR FOR DIRECTIONAL RECEIVERS
Filed Jan. 12, 1939   3 Sheets-Sheet 3

Inventors
Paul Hermanspann
& Rudolf Weber
By
Attorney

Patented Feb. 3, 1942

2,271,550

UNITED STATES PATENT OFFICE 2,271,550

OPTICAL AND ACOUSTIC INDICATOR FOR DIRECTIONAL RECEIVERS

Paul Hermanspann and Rudolf Weber, Leipzig, Germany, assignors to Telefunken Gesellschaft für Drahtlose Telegraphie m. b. H., Berlin, Germany, a corporation of Germany Application January 12, 1939, Serial No. 250,486
In Germany November 12, 1935

4 Claims. (Cl. 250—11)

This invention relates to indicators for directional radio receivers and more particularly to a combination of optical and acoustic indicators for homing receivers.

Figure 1 is a graphic representation of the response pattern of a homing receiver;

Figure 2 is a schematic circuit diagram of one embodiment of homing receiver;

Figure 3 is a graphic illustration of the wave form of currents applied to the indicator;

Figure 4 represents graphically the wave form currents representing E—T signals;

Figure 5 is a simplified diagram of a prior art homing device;

Figures 6a, 6b, 7a and 7b represent the wave forms of currents applied to the prior art device;

Figure 8:
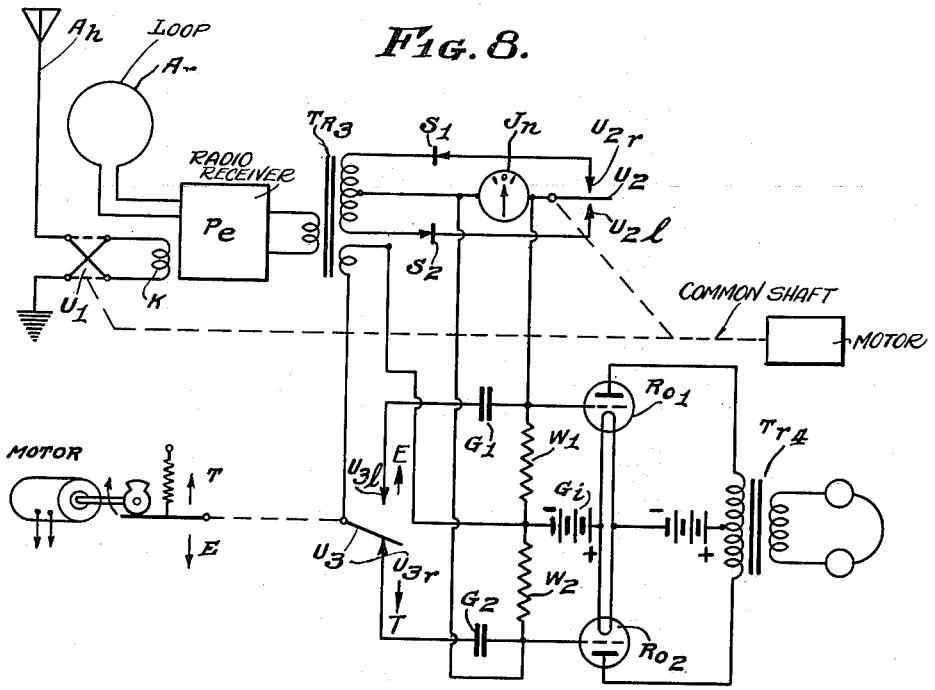
Figure 8 is a schematic circuit diagram of one embodiment of the invention.

It is known in the prior art to use the combination of a frame and an auxiliary uniformly directive antenna in directive flying. Referring to Fig. 1, R represents the figure of eight pattern of a normal direction-finding loop antenna. Now, is the patterns of a loop and an auxiliary uniformly directive antenna are superposed, then the resulting directive pattern may be represented by a cardioid. The origin of this pattern may be explained mathematically in the following manner:

The directive equation of the loop antenna in a polar coordinate system is $r_1 = \cos \phi$, the equation of the uniformly directive antenna $r_2 = 1$. By adding, that is, by coupling the two radio frequency voltages, there results for the combination of the patterns of the two antennae:

$$r = r_1 \pm r_2 = 1 \pm \cos \phi \text{ (cardioid)}$$

The ± sign is used because the coupling of the two antennae may be in one sense or the other. The resulting patterns are represented graphically in Fig. 1 by curves $C_1$ and $C_2$. Naturally in practice pure cardioid diagrams do not result; other mathematical factors appear in the directive equations of the two antennae.

Such cardioids are employed for direction-finding in aerial navigation. In Fig. 2 a suitable homing receiver is shown schematically. To the receiver PE is connected the frame $A_r$. By means of the coupling loop K the auxiliary antenna $A_h$ may be coupled to the input circuit of the receiver. A rectifier S with the indicating meter $J_n$ is connected to the output end of the receiver by a transformer $Tr$. It is possible by means of the two switches $U_1$ and $U_2$, interlocked by way of G, to couple the auxiliary antenna in one or the other direction to the receiver and to send the direct current coming from S through the instrument $J_n$ in one direction or the other. Now, if the two switches $U_1$ and $U_2$ are continuously switched by means of a driving device in such a manner that they remain in the two end positions an equal period of time, then the two direction-finding cardioids shown in Fig. 1 result alternately at the rate of switching.

If a transmitter is located in the bearing direction indicated by the arrow in Fig. 1, then the receiver picks up from the transmitter equal amounts of energy in the two cardioids. Since the meter $J_n$ is switched in the same cadence or at the same rate as the receiving diagrams, then equal currents alternating in direction at the rate of switching or change-over will flow through it. If the meter is sufficiently sluggish in action, then the pointer remains continuously in the zero position. However, if the airplane deviates from the direct transmitter direction or course, then unequal amounts result from the two cardioids. Likewise, the direct currents flowing through the meter are unequal and the pointer leaves its zero position and is deflected to one side. By way of example, one wave form of the deflecting currents is shown in Fig. 3. By means of a suitable circuit organization, it is possible to make arrangements so that the pointer will be caused to deflect towards the left when the airplane deviates to the left away from its course, and vice versa. In practice such type of indication is called "dead beat bearing indication."

In a similar way, direction-finding may be predicated upon acoustic or audible indications. For this purpose the meter $J_n$ is replaced by earphones. Switch $U_2$ and rectifier S are dispensed with. In this case the switching frequency must be chosen differently in order to discern lateral deviations from the course in the earphones, that is, suitably in such a manner that the switching is produced at the rate of complementary Morse-code signals (E—T or A—N). In Fig. 4 the voltage at the earphones is shown with respect to time for switching at the rate of letters E and T, it being assumed also in this case that the transmitter lies in the bearing direction of course. The curve of Fig. 4 represents the envelope of the audio frequency. It can be seen that the voltages at the earphones are equal in amount, and therefore a permanent tone is heard in the earphones. For a lateral deviation of the airplane away from the direct course to the transmitter one or the other of the two signals predominates or is louder.

Optical indicating devices have been employed in addition to the acoustic indicator means. Fig. 5 shows such an organization. In parallel relation to the earphones $E_t$ by way of the transformer $Tr$ and the rectifier S another transformer $Tr_2$ is connected. To the secondary of the latter is connected an indicating instrument which works on the ballistic principle. Such an instrument can be so made so that the moving coil system pivots in an inhomogeneous field in such a manner that the moving coil, for larger deviations, is in a weaker field. The operation of the circuit organization shown in Fig. 5 shall now be described by reference to Figs. 6a, 6b, 7a and 7b.

In order to explain more clearly the operation of the instrument $J_b$ it has been assumed in Fig. 6a that only the letter E exists, while in Fig. 7a the letter T. If an airplane carrying the direction finder deviates from the course pointing to the transmitter, the two signals appear with different amplitudes. For instance, if only the signal E exists (Fig. 6a), then a direct current represented by the area E flows through the rectifier S. In the secondary of the transformer $Tr_2$ current impulses are induced as represented in Fig. 6b. Fig. 7b shows the result when only the letter E exists. The direct current flowing through the rectifier S is then represented by the area T. It can be seen from the Figs. 6b and 7b that of the two current impulses lying close together the positive one appears first when the letter E predominates, and the negative when T is louder. Since, as has already been mentioned, $J_b$ is a ballistic instrument, it responds only to the current impulse arriving first. In other words it kicks for a louder E to one side, and for a stronger T to the other side. However, this type of optical indication has this considerable disadvantage that the ballistic indicating instruments also respond to atmospherics and thus easily cause directional errors in flying. This type of indication is called "kick or quiver indication" in practice.

To avoid the disadvantages of devices known and suggested in the prior art, this invention discloses a homing receiver comprising both optical and acoustic reading or indicator means. The invention is more particularly characterized by a combination of optical or visual dead-beat direction finding indicator means and of acoustic or aural indication means with a pair of switches or change-over devices. One of the switches is operated at the rate or rhythm of like signals and the other switch operated at the rate of complementary Morse-code signals. The switches are adapted to cooperate in such a way that, in each switch or working position of the switch operating at the complementary-signal rate, the energy picked up by the antenna system acts upon an audio frequency amplifier arrangement only during the period when the change-over device working at the rhythm of like signals occupies the working or switching position corresponding to one of the directional cardioids. The antenna energy, on the contrary, controls the optical or visual reading means only by way of the switch actuated at the rhythm of like signals.

Thus the essential idea of the invention is that the operation of the amplifier arrangement is controlled in proportion to the output energy corresponding to the one or the other cardioid patterns, in such a manner that to each of the different operations is coordinated a certain position of the switch working at the rate of complementary signals. In this manner the audio frequency voltage which passes by way of the switching means operating in complementary Morse-code letter cadence, for the one switching position of the switching means, reaches the audio frequency amplifier arrangement whose sensitivity is proportional to the output energy existing for one cardioid, while in the other switching position of the said swiching means it reaches the audio frequency amplifier arrangement whose sensitivity is proportioned to the output energy of the other incoming cardioid. The optical indication means which gives dead-beat readings is controlled solely by way of the switching means operated in cadence with or at the rate of equal signals.

In Fig. 8 an exemplified embodiment of the idea underlying the invention is shown. The two antennae $A_h$, $A_r$ are connected in the customary manner to the receiver $P_e$ by way of the switch $U_1$. To the output end, by way of the transformer $Tr_3$, is connected the instrument $J_n$, which, in the present case, receives current by means of the switch $U_2$ from two rectifiers $S_1$ and $S_2$. The two switches $U_1$ and $U_2$ are coupled with each other (interlocked) and effect change-overs at the same moment. The additional acoustic indication means is operated by the switch $U_3$ which switches at the rate of cadence of letters E and T. Two tubes $Ro_1$ and $Ro_2$ similar to a push-pull arrangement are connected to the earphones by way of the transformer $Tr_4$. The grid battery, by way of the resistances $W_1$ and $W_2$, applies such a high negative voltage to the grids of the tubes that they are cut off. However, additional D. C. voltages are impressed upon the grids so that the tubes are biased less negatively or made responsive. The potential drops caused at the instrument $J_n$ by the currents coming from the rectifiers $S_1$ and $S_2$ are employed as the additional D. C. voltages serving to open the two tubes. Furthermore, audio frequency voltages from a special winding of the transformer $Tr_3$ are applied to the two grids by way of condensers $G_1$ and $G_2$ at the rate of operation of the switch $U_3$. It should be understood that the audio frequency determined by the rate of operation of the synchronized switches $U_1$, $U_2$ should be higher than the E—T keying rate of the switch $U_3$.

The operation of the organization is as follows:

The tubes are biased less negatively in cadence with the change-over rate or frequency of switch $U_2$ in such a manner that the tube $Ro_1$ is responsive when the left cardioid is operative; that is, when the switch $U_2$ is in the position $U_{2l}$. The tube $Ro_2$ is responsive when the right cardioid is operative; that is, when the switch $U_2$ is in the position $U_{2r}$. In addition, the tube $Ro_1$ is impressed with audio frequency voltage in cadence with the letter E and $Ro_2$ in cadence with the letter T. For the switching of the signal E the switch $U_3$ will be in the position $U_{3l}$ and for the signal T it will be in the position $U_{3r}$. When the two cardioids are identical, the two tubes R₀₁ and R₀₂ are equally responsive, and as a result, the amplitudes of the amplified alternating currents of the signals E and T flowing in the two plate circuits are equal; that is, they result in a continuous or permanent tone. When the airplane is not headed directly towards the transmitter, one of the two signals will be louder.

The advantage of this indication means, above all, lies in the fact that optical indication and acoustic indication are possible at the same time without the disadvantages residing in the accessory optical indication means which are customarily provided. The device is very insensitive to atmospherics. In order to avoid such trouble as may be due to dissimilarity of the two tubes R₀₁ and R₀₂ (which, for instance, may be caused by differences in emission), it is expedient to employ in suitable places regulating means, for instance, in the form of resistances. The resistances are then regulated in such a manner that the two tubes are made practically equally responsive.

When mechanical switches are employed, it is practical to place them on a common shaft and to operate them from a common source of power. The exemplified embodiment shown in Fig. 8 involves a rather elaborate circuit. This disadvantage is avoided according to a further object of the invention by employing only one tube whose grid is impressed with a constant audio frequency voltage. In addition, the voltages existing at the optical instrument are applied, at the rate or rhythm of complementary Morse-code signals, to the grid of the tube.

Figure 9:
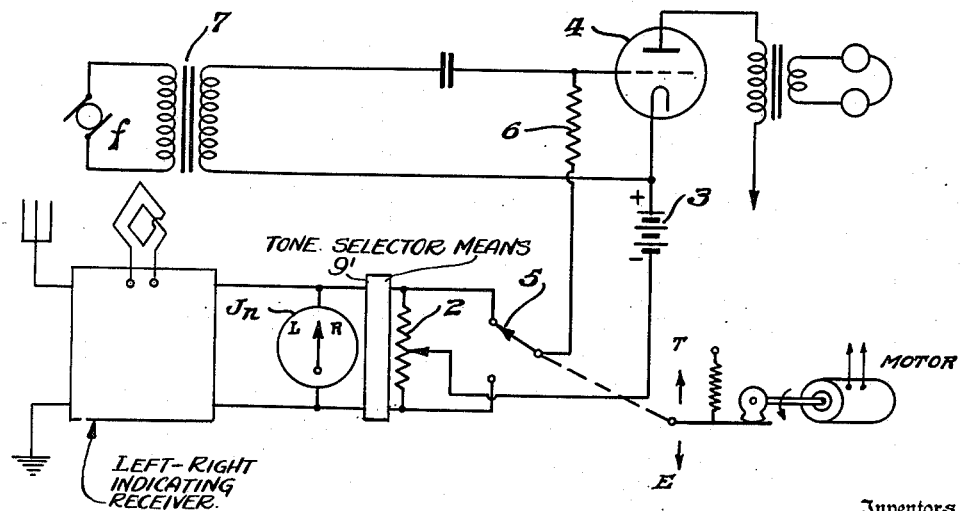
Figure 9 is a circuit diagram of another embodiment.

In Fig. 9 a schematic circuit diagram of the simplified arrangement is shown. The reference letters J$_n$ represents the indicating meter of a normal "left-right indicating" receiver. Connected in parallel to this meter, for instance, is a high-resistance potentiometer 2 whose center tap is connected with the cathode of the tube 4 by way of the grid battery 3. The terminals of the potentiometer 2 are connected to the switching contacts of the switch 5 whose arm or lever is connected to the grid of tube 4 by way of the resistance 6. In addition, by means of a generator $f$ constant audio frequency currents are applied to the grid of the tube by way of the transformer 7. In the plate circuit of the tube is a telephone which, for instance, is connected by way of a transformer. The switch 5 switches in cadence with complementary Morse-code signals and thus impresses alternately on the grid of the tube the rectified voltages existing across the meter J$_n$. By a suitable choice of the grid battery 3 the operating point of the tube can be so placed that it lies approximately in the middle of the tube characteristics.

By the operation of the switch 5 the degree of amplification or gain of the tube is increased or decreased a greater or smaller amount according to the rectified voltages existing across the meter J$_n$. For instance, if the receiver is so placed that the course passes the transmitter on one side, then a voltage results at the meter which indicates this lateral deviation. By way of example, at the upper terminal of the meter J$_n$ there may be a positive voltage. The tube 4 will then amplify more when the lever of 5 lies on the upper switching contact. If this position corresponds to the letter E, then this letter predominates as a louder tone in the earphones.

One disadvantage of the circuit is that, besides the currents of audio frequency and switching frequency of the switch 5, currents of another frequency, which results from the switching of the directional antennae employed in the homing receiver, are applied to the telephone receiver. This manifests itself by the lack of clearness or blurred condition of the tone or note. In order to avoid this shortcoming, tone selection means 9' may be provided between the instrument J$_n$ and the potentiometer 2 for the above-mentioned frequency.

Figure 10:
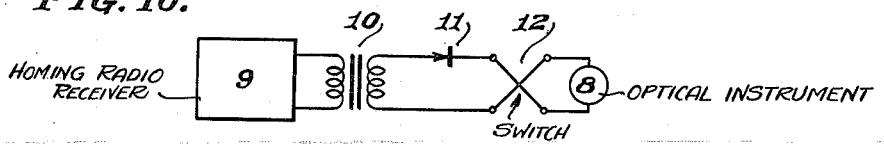
Figure 10 is a circuit diagram used for illustrative purposes.
Figures 12A, 12B:
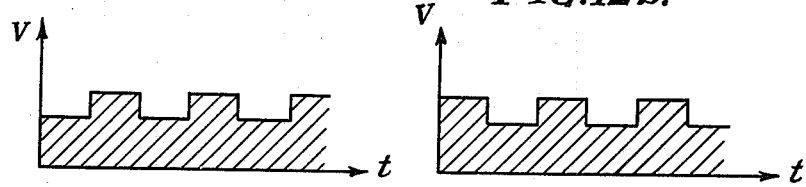
Figures 12a, 12b, 13a, 13b, 14a and 14b are graphic illustrations used in explanation of invention.

In the exemplified embodiments hereinbefore discussed the instrument for optical indication, which is supposed to give a "dead beat indication," is still influenced by smaller kicks or quiver impulses. An explanation of these kicks or quiver impulses shall be given by reference to Fig. 10 which basically shows the connection of the optical instrument 8 and a homing receiver 9. A transformer 10 is connected to the output of the receiver whose secondary feeds a rectifier 11. The direct current of the rectifier is fed to the instrument 8 by way of the switch 12. In Figs. 12a and 12b the voltages existing at each moment at the rectifier 11 are shown graphically. In Fig. 12a are shown the case in which the homing receiver deviates to the left of the direct path or course, while at the right the corresponding deviation to the right is shown. It is seen that a small alternating current is superposed upon a direct current. As a result of the operation of switch 12 not only half-cycles of the alternating voltages are impressed upon instrument 8, but also the D. C. potential, at the rate of the changeover. As a consequence the instrument receives additional current impulses which render deadbeat reading almost impossible. Even the use of sluggish instruments results in only a slight improvement. Therefore, according to a further object of the invention, a transformer is connected between the audio frequency rectifier 11 and the switch 12 for the instrument 8.

Figure 11:
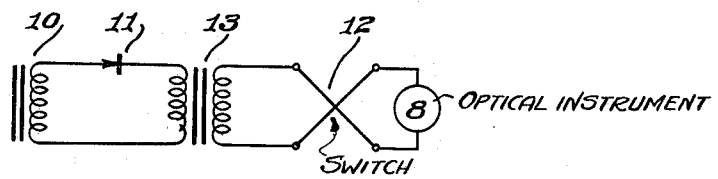
Figure 11 is a circuit diagram of an improved detail.
Figures 13A, 13B:
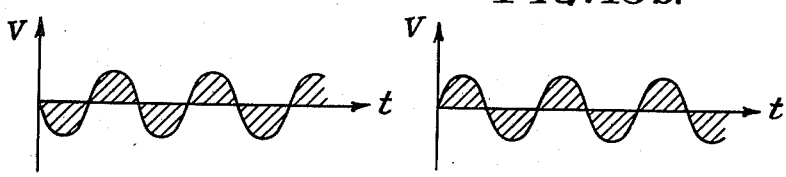
Figures 14A, 14B:
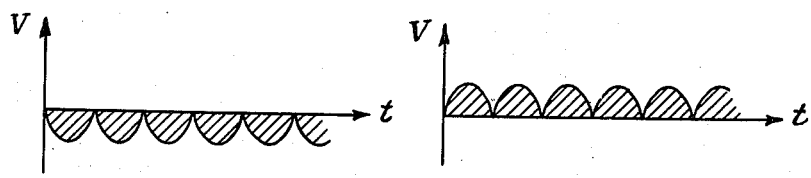

Fig. 11 shows such a circuit. The secondary of the transformer 10 feeds the primary of the transformer 13 by way of the rectifier 11. The secondary of 13 is directly connected with the instrument 8 by way of the switch 12. Due to the interposition of the transformer 13 this direct current component is not allowed to reach the instrument 8. In Figs. 13a and 13b, the voltages existing at the secondary of the transformer 13 are shown graphically. After the switching by the switch 12, voltages result as shown in Figs. 14a and 14b. It can easily be seen from these figures that only the half-cycles of the alternating current are fed to the instrument. Thus with a suitable arrangement, steady or dead-beat bearing indications or readings will result.

We claim as our invention:

1. In a directional receiver, means for visually indicating departures from a course, an aural indicator, a source of audio frequency current, means for applying currents from said source to said aural indicator to form complementary telegraphic signals of controllable relative loudness, means non-reactively connecting said source with said indicating means for controlling the relative loudness of said complementary signals without affecting adversely said visual indicating means, and acoustic means responsive to said audio frequency signals for indicating said course departures as a function of the relative loudness of said complementary signals.

2. In a directional receiver, means for visually indicating departures from a course, a source of audio frequency currents, means for deriving from said source currents bearing complementary telegraphic signals, an amplifier responsive to said signal bearing currents, means connected to said visual indicating means for varying the amplification of said amplifier as a function of said course departures so that the relative loudness of said complementary signals acoustically indicates said departures.

3. In a directional receiver, a meter for indicating departures to the left or right of a course, a source of audio frequency currents, means for deriving from said source currents including one telegraphic signal representing said left and another telegraphic signal representing said right course departures, a pair of amplified tubes, means for applying said keyed audio currents to said pair of amplifier tubes, means for connecting said meter and said pair of amplifier tubes for varying the gain characteristics of said tubes as a function of said left or right course departures so that one or the other of said tubes is more responsive, and acoustic means for indicating such response in terms of the relative loudness of said signals.

4. In a directional receiver, a meter for indicating departures to the left or right of a course, a source of audio frequency currents, means for deriving from said source signal bearing currents with one telegraphic signal representing said left and with another telegraphic signal representing said right course departures, an amplifier, means for applying to said amplifier said signal bearing currents, means connecting said meter and said amplifier for increasing the amplification of said amplifier as a function of course departure in one sense and for decreasing said amplification as a function of course departure in the opposite sense, and acoustic means for indicating such response in terms of the relative loudness of said signals.

PAUL HERMANSPANN.
RUDOLF WEBER.